(12) United States Patent
Deveau et al.

(10) Patent No.: US 6,953,120 B2
(45) Date of Patent: Oct. 11, 2005

(54) METHOD OF RECOVERING METAL AND/OR OXIDE THEREOF IN A SLURRY AND TAILINGS OBTAINED FROM SAID METHOD

(75) Inventors: Claude Deveau, Lac du Bonnet (CA); Stephen R. Young, Lac du Bonnet (CA)

(73) Assignee: Cabot Corporation, Boston, MA (US)

( * ) Notice: Subject to any disclaimer, the term of this patent is extended or adjusted under 35 U.S.C. 154(b) by 246 days.

(21) Appl. No.: 10/071,841

(22) Filed: Feb. 8, 2002

(65) Prior Publication Data

US 2003/0152503 A1 Aug. 14, 2003

(51) Int. Cl.$^7$ .......................... B03C 1/00; C01G 35/00; C01G 19/00; C01G 3/00; C01G 53/00
(52) U.S. Cl. ................... 209/10; 209/12.1; 423/150.6; 423/150.1; 423/150.3; 423/113; 423/25; 423/26; 423/89; 423/62; 75/711; 75/722; 75/743
(58) Field of Search .................... 75/711, 722, 743; 423/150.6, 150.1, 150.3, 113, 25, 26, 89, 62; 209/12.1, 162, 10

(56) References Cited

U.S. PATENT DOCUMENTS

| | | | |
|---|---|---|---|
| 2,875,896 A | 3/1959 | Last et al. | 209/166 |
| 2,951,585 A | 9/1960 | Burks | 209/167 |
| 3,923,647 A | 12/1975 | Petrovich | 209/166 |
| 3,951,786 A | 4/1976 | Petrovich | 209/166 |
| 4,178,235 A | 12/1979 | Wilson | 209/166 |
| 4,455,223 A | 6/1984 | Petrovich | 209/166 |
| 4,493,817 A | 1/1985 | Biss | 423/62 |
| 5,047,144 A | 9/1991 | Dobias et al. | 209/166 |
| 5,053,119 A | 10/1991 | Collins et al. | 209/166 |
| 5,411,719 A | 5/1995 | Hollitt et al. | 423/69 |
| 5,787,332 A | 7/1998 | Black et al. | 423/9 |
| 6,041,939 A | 3/2000 | Shi et al. | 209/5 |
| 6,200,377 B1 | 3/2001 | Basilio et al. | |

FOREIGN PATENT DOCUMENTS

| | | |
|---|---|---|
| DE | 3626920 A1 | 2/1988 |
| EP | 0 243 725 A2 | 4/1987 |

OTHER PUBLICATIONS

Monerieff, et al.: "Developments and Operation of Cassiterie Flotation at Mines of the Consolidated Gold Fields Group", no date given, pp. 1–28.
"Investigation of Collector Systems for the Flotation of Cassiterite", Mining and Metallurgy published Jun. 10, 1967, pp. 077–093.
Lepetic, Vuko M., "Cassiterite Flotation A Review", Advances in Mineral Proceeding Symposium Mar. 1986, pp. 1–10.
Morizot, G., et al., "Selective Sn/No–To Flotation: The Impact of Grinding Conditions on the Floatability of Cassiterite", no date given., pp. 121–129.
R.O. Burt et al., "Flotation of Tantalum Minerals", Preprints–XIV International Mineral Processing Congress Worldwide Industrial Application of Mineral Processing Technology, pp. IV.121–IV.12.19, (Abstract), no date.
O. Burghardt et al., "Contribution to the Benefication of a Tantalum Niobium Ore from China"Autbereit Tech. vol. 28, No. 12 pp. 704–710, Dec. 1987.
Richard Burt "Beneficiation of Tantalum Ore–How it is Achieved and Count it be Better", Edited by E. Chen et al., The Minerals, Metals & Materials Society, 1996, pp. 17–22.
International Search Report for PCT/US03/03617, Jun. 2003.

*Primary Examiner*—Steven Bos

(57) ABSTRACT

A method of recovering metal and/or oxide thereof from a slurry is described. The method involves magnetically separating at least a portion of any magnetic impurities from the slurry and then leaching or dissolving at least a portion of any remaining magnetic impurities in a slurry. At least one chelating agent can then be added to the slurry and the solids can be recovered from the slurry by various separation techniques. The methods of the present invention are particularly useful in the recovery of tantalum and/or oxide thereof especially tantalum and/or oxide thereof having a very fine size.

35 Claims, No Drawings

METHOD OF RECOVERING METAL AND/OR OXIDE THEREOF IN A SLURRY AND TAILINGS OBTAINED FROM SAID METHOD

BACKGROUND OF THE INVENTION

The present invention relates to the recovery of metals and/or oxides thereof and more particularly relates to the recovery of metals and/or oxides thereof from such sources as ore and mill tailings and the like. Even more particularly, the present invention relates to the recovery of such metals as tantalum and/or niobium and/or oxides thereof.

Many metals and/or oxides thereof are recovered from such sources as ore wherein a variety of different separation techniques are used. For instance, with respect to tantalum, tantalum and/or oxides thereof are typically recovered from mining operations wherein the tantalum and/or oxide thereof is present as an ore. The ore is typically reduced to a small aggregate or particle size such as about 200 microns or less. This reduction in size can be accomplished, for instance, using ball milling or other reduction steps. After the reduction of the ore to a small particle size, gravity separation techniques can be used to recover tantalum wherein, due to the density of tantalum and/or oxide thereof, the tantalum and/or oxide thereof will settle prior to other minerals present in the ore and thus recovery of a large percentage of the tantalum and/or oxide thereof is possible. However, a percentage of the tantalum and/or oxide thereof that is present in the ore will typically be reduced to a very small particle size such as below about 10 microns which prevents the separation of this form of tantalum and/or oxide thereof by gravity techniques. Typically, in separation operations, this tantalum and/or oxide thereof will simply be discarded as tailings and therefore remain unrecoverable which is a significant economic loss to the mining operations.

While flotation is a technique that can possibly be used in the recovery of metals and/or oxides thereof, the flotation technique with respect to the recovery of metals and/or oxides thereof such as tantalum and/or oxides thereof has been unsuccessful in previous attempts because either a very small percentage of the tantalum and/or oxide thereof is recovered by flotation or the recovery is interfered with by the presence of other unwanted impurities such as other metallic impurities, such as iron. Accordingly, the use of flotation for the recovery of fine size fractions of metals and/or oxides thereof, such as tantalum and/or oxide thereof, has generally been unsuccessful.

There is a need in the industry for processes to permit the total recovery of or the near total recovery of all tantalum and/or oxide thereof present in ore or other sources including the very fine size fractions of tantalum and/or oxide thereof found in ore as well as other sources.

SUMMARY OF THE PRESENT INVENTION

A feature of the present invention is to provide a method to recover metal and/or oxides thereof, such as tantalum and/or oxides thereof, from a variety of sources.

Another feature of the present invention is to permit the recovery of metals and/or oxides thereof from a slurry by flotation techniques.

An additional feature of the present invention is to permit the entire recovery or nearly the entire recovery of such metals as tantalum and/or oxides thereof from ore or other sources.

A further feature of the present invention is tailings obtained from ore, wherein the tailings contain about 250 ppm or less tantalum and/or oxides thereof, wherein the ore is obtained from tantalum bearing ore.

An additional feature of the present invention is metal and/or oxides thereof recovered from one or more of the above-identified processes.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method of recovering metal and/or oxides thereof or both, such as valve metals and/or oxides thereof that are present in a slurry. The method involves magnetically separating at least a portion of magnetic impurities, such as iron, from the slurry. At least a portion of any remaining magnetic impurities in the slurry is then leached or dissolved. At least one chelating agent is then added to the slurry and then the solids that are present in the slurry are then recovered. These solids recovered are typically the desired metal and/or oxides thereof.

The present invention further relates to the additional step of forming a new slurry from the solids that have been recovered. At least one surfactant can be added to the newly formed slurry and the newly formed slurry can then be subjected to flotation techniques and/or other recovery techniques to recover the very fine size fractions of the metal and/or oxides thereof that are present.

The present invention further relates to a method to recover a 100% or nearly a 100% of all valve metal and/or oxides thereof, such as tantalum and/or oxide thereof, present in ore or mill tailings using the above-described process in combination with gravity separation techniques or other separation or recovery techniques.

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to various methods to recover metal and/or oxides thereof from a variety of sources such as ore and mill tailings and the like. For purposes of the present invention, the metal and/or oxides thereof recovered by the processes of the present invention can be any metal or metal oxide or both that needs to be separated from impurities such as impurities found in mill tailings and ore. Preferably, the metal is a valve metal such as tantalum, niobium, vanadium, aluminum, and the like. More preferably, the metal that is recovered is tantalum and/or niobium. Other examples of metals that can be recovered are tin, copper, nickel, lead, cobalt, and the like. For purposes of the present invention, oxides of these various metals can also be recovered by the present invention. Typically, in tailings and ore, the oxide of the metal is recovered. Accordingly, for purposes of the present invention, the recovery of metals and oxides thereof are encompassed by the present invention.

In the method of the present invention, the metal and/or oxide thereof to be recovered is preferably present in a slurry. The slurry can be formed by mixing the metal and/or oxide thereof with water or other mediums. The metal and/or oxide thereof present in the slurry can be in any form but is typically in the form of particles or aggregates. More preferably, the particle size of the metal and/or oxide thereof as well other impurities that may also be present in the slurry is preferably from about 1 micron to about 100 microns and more preferably from about 1 micron to about 75 microns, and even more preferably from about 5 microns to about 35 microns. The slurry that contains the metal and/or oxide thereof preferably has a concentration of from about 100 ppm to about 2,000 ppm. Other amounts above and below these amounts can be used. Preferably, the concentration in the slurry is about 0.01% $Ta_2O_5$ to about 0.200% $Ta_2O_5$.

The slurry containing the metal and/or oxide thereof to be recovered, in the process of the present invention, can then be subjected to a magnetic separation, which preferably removes at least a portion of any magnetic impurities present in the slurry. The magnetic impurities are typically metal containing impurities and more preferably are metals which are different from the metal and/or oxide thereof to be recovered. For instance, magnetic impurities include, but are not limited to, iron which is preferably separated from the metal and/or oxide thereof to be recovered, which is preferably tantalum and/or oxide thereof. The magnetic separation can occur by any magnetic separation techniques such as, but not limited to, a wet low intensity magnetic separator following manufacturers instructions for operation. For example, an Eriez (concurrent type) wet low intensity magnetic separator with a magnet strength of 1000 Gauss is preferable used for removal of the magnetic impurities. For instance, a feed slurry can pass through a trough in the same direction as the rotation of the drum. Magnetic particles are attracted to the rotating surface of the drum by fixed magnets within the drum. Non-magnetic material sinks to the lowest point in the trough and is drawn off. Magnetic particles are carried by the rotating drum through a gap, where they are compressed and dewatered before passing over a weir. The feed rate to the magnet can be any amount depending on the type and size of the magnetic separator. For instance, the feed rate can be 100 gpm per lineal foot.

The magnetic separation that occurs is generally a low intensity magnetic separation, for instance, below 2000 gauss when the metal and/or oxide thereof to be recovered is tantalum and/or oxide thereof. Since tantalum and/or oxide thereof is a para-magnetic material, a low intensity magnetic separation avoids magnetically attracting tantalum and/or oxide thereof or other similar types of metals and/or oxides thereof. In other words, the low intensity magnetic separation preferably attracts iron and not tantalum and/or oxide thereof, thereby separating the iron from the tantalum and/or oxide thereof. Preferably, the use of such a low intensity magnetic separation removes approximately 70% by weight of any magnetic impurities present in the slurry especially magnetic impurities like iron.

After the magnetic separation, any remaining magnetic impurities including any remaining iron that is present in the slurry can then be leached or dissolved. In more detail, the remaining magnetic impurities are generally present in a solid form. In this step, the remaining magnetic impurities are preferably leached or dissolved so as to be present as a liquid in the slurry. In other words, the leaching or dissolving of the magnetic impurities preferably converts the solids into metal ions that are present in the liquid phase of the slurry. The leaching or dissolving of at least a portion of the remaining magnetic impurities can be accomplished, for instance, by the addition of one or more reagents that are capable of leaching or dissolving at least a portion of the remaining magnetic impurities present in the slurry. For instance, one or more acids can be added to accomplish this purpose. Preferably, the acid is sulfuric acid. Sulfuric acid is preferably added at a 93% concentration. The quantity of acid is preferably dependent on maintaining or obtaining a pH of about 2.0 in the leaching stage. The quantity of acid may vary with the efficiency of the magnet. A preferred addition is about 6 kg/Mt (Mt=metric ton, or 1000 kg). Other acids, such as phosphoric acid or any iron-dissolving acid can be used.

Once at least a portion of the remaining magnetic impurities are leached or dissolved, one or more chelating agents are preferably added to the slurry. Preferably, the chelating agent is citric acid. Other chelating agents that can be used include, but are not limited to, EDTA and the like.

The chelating agent is preferably added in an amount sufficient to prevent the magnetic impurities which have been converted to ionic form from reacting or joining with the metal to be recovered which is present in the slurry (and/or possibly joining with and consuming the surfactant). Preferably, the amount of the chelating agent present is from about 0.15 kg/Mt to about 0.5 kg/Mt, and more preferably from about 0.2 kg/Mt. to about 0.35 kg/Mt.

After the addition of the chelating agent, the remaining solids that are present in the slurry including the metal and/or oxide thereof to be recovered are separated from the liquid phase of the slurry. Typically, the recovery of the solids that are present in the slurry can be accomplished by any separation technique such as filtration. The filtration can be accomplished using a pressure, belt, drum, or disc filter. The more complete the removal of liquor, the more selective the flotation process will be. The chelating agent is preferably added at the same time or about the same time as the acid. The chelating agent and acid can be added sequentially, or in any other combination or order. By preferably adding the chelating agent and the acid at about the same time, the sequestering of iron ions and/or other magnetic impurities, which are being produced by the addition or presence of the acid, occurs more effectively. The retention time for the leaching process can be any time sufficient to cause the sequestering of the iron ions or metal-containing impurities. Preferably, the retention time is approximately one hour when operating at a pH of 2.0. Again, other pHs which enable the timely dissolving of the metal ions such as iron ions can be used. Any retention time can be used. It is beneficial to provide a sufficient retention time to ensure that the sequestering of metal ions, such as iron ions, has occurred prior to filtration. Upon providing sufficient time for the sequestering of the metal ions such as iron ions, the filtration of the slurry can then occur.

Once the solids are separated and recovered from the liquid phase of the slurry, the solids preferably contain nearly 100% of the metal and/or oxide thereof to be recovered. The solids can then be formed into a new slurry using any aqueous phase such as water or deionized water. The new slurry is typically formed at a weight percent of from about 5% to about 60% and more preferably from about 30% to about 50% of solid based on the weight of the new slurry. After the formation of a new slurry, at least one surfactant can be added to the slurry. The surfactant generally chosen (and the amount used) is based on the ability to form a slurry that permits the recovery of the metal and/or oxide thereof to be recovered by such separation techniques as a flotation process. A preferred surfactant for the recovery of tantalum and/or oxide thereof that is present in the new slurry, for instance, is sulphosuccinamate. Other surfactants that can be used include, but are not limited to, phosphoric acids, fatty acids, acid phosphates, hydroxamic acids, sulphonates, and any combinations and the like. The amount of the surfactant that is preferably used with the formation of the new slurry is from about 0.1 kg/Mt to about 1.0 kg/Mt and more preferably from about 0.3 kg/Mt to about 0.8 kg/Mt, and most preferably from about 0.4 kg/Mt to about 0.55 kg/Mt. The surfactant can be add as a batch, continuously, sequentially, or in any other order of addition. Preferably, the surfactant is added on a continuous basis and in or prior to each flotation cell.

After the formation of the new slurry with the surfactant present, the slurry can then be subjected to a flotation process wherein the metal and/or oxides thereof to be recovered is recovered by the agitation of the slurry and the introduction of air at the point of agitation in order to result in the flotation of the metal or oxides thereof to be recovered at the surface. For instance, in the recovery of tantalum and/or oxide thereof from the slurry, the agitation can be at 400 rpm or other conventional agitation speeds. The air addition is generally very minimal, such as, but not limited to, rates below 5 cfm per cell in a Denver Sub A 24.

In the above-described process, the slurry can have any pH. More preferably, the pH of the slurry during the process operations is a pH of about 4 or lower and more preferably a pH of from about 1.7 to about 2.0.

Further details of the processes that can be used in the recovery of the metal that is present in the new slurry by flotation techniques is described in "Flotation Theory, Reagents and Ore Testing" by Ronald D. Crozier (Pergamon Press, 1992), which is incorporated in its entirety by reference and forms a part of the present application The process of the present invention as described above permits up to 100% recovery of the metal and/or oxide thereof to be recovered. For instance, from 90% or higher and more preferably nearly 100% and even more preferably about 100% of the total tantalum and/or oxide thereof present by weight in the starting metal slurry can be recovered using the above-described process.

Thus, the above-described process can be used in combination with other separation techniques in order to recover nearly 100% or about 100% of the metal or oxide(s) thereof that is recoverable from ore or mill tailings, or other sources. For instance, with respect to the recovery of tantalum and/or oxides thereof, the mill tailings or ore that contain the tantalum and/or oxides thereof can be crushed or ground to an appropriate liberation size such as about 200 microns or less. This crushed material can then be subjected to a gravity separation which is conventional in the art in order to recover approximately 70% of the tantalum and/or oxide thereof present. After the recovery of that tantalum and/or oxide thereof, the remaining material can then be subjected to the above-described process which involves magnetic separation, leaching, or dissolving, the addition of at least one chelating agent, and the recovery or separation of the solids from the liquid phase of the slurry. After the formation of a new slurry containing the solids that were recovered from the original slurry, this new slurry can then be combined with at least one appropriate surfactant and subjected to a flotation process to recover the remaining tantalum and/or oxide thereof present which typically has a particle size of about 35 microns or less and more preferably from about 1 micron to about 20 microns.

Other than a flotation technique, other recovery methods can be used in the present invention to recover the desired metal and/or oxides thereof. Furthermore, other reagents and compounds or other treatments can be included in the present invention to maximize or optimize recovery efforts.

One of the benefits achieved with the processes of the present invention is the ability to recovery the target metal and/or oxides thereof from metal bearing sources such as ore and/or mill tailings and/or mineral processing plant rejected material and the like. In a preferred embodiment, the metal recovered is tantalum, preferably in the form of a metal oxide, such as tantalum pentoxide. Since the present invention is capable of recovering a large percentage of the target metal and/or oxides thereof from the metal bearing source, the present invention relates to the recovered metal and/or oxides thereof and preferably by the above-described processes. Further, the present invention relates to tailings such as mill tailings which contain a very low level of the targeted metal and/or oxides thereof because the metal or the oxide thereof has been efficiently recovered by one or more processes of the present invention. Preferably, the tailings contain less than 1 wt % of the targeted metal and more preferably less than 500 ppm and even more preferably less than 250 ppm or even less than 100 ppm of the targeted metal and/or oxides thereof. In a preferred embodiment, the targeted metal is tantalum and therefore the tailings, such as mill tailings, which are processed by the present invention contain, after being processed by the present invention, about 250 ppm or less tantalum or oxides thereof in the tailings and more preferably about 200 ppm or less tantalum oxides and even more preferably about 150 ppm or less, or about 100 ppm or less and most preferably 70 ppm or less, or 50 ppm or less (e.g., 10 ppm to 70 ppm $Ta_2O_5$) tantalum oxides (e.g., tantalum pentoxide) that is present in the tailings. This is quite impressive. Examples of tantalum bearing ore which is processed into tailings wherein a significant amount of the tantalum is recovered and thus removed from the tailings include, but are not limited to, pegmatite structures. Tantalum containing ore includes carbonitite, apo-granite, alkaline complex, pegmatitic granite, and/or scam. The typical tantalum containing minerals include wodginite, pyrochlore-microlite group, microlite, Simpsonsite, colombo-tantalite group (covers tantalite), ixiolite, bismutio-tantalite, tapiolite, and the like. Titano-wodginite, rankamaite and any tantalum bearing oxide minerals are some other minerals. Typically, many of these tantalum bearing minerals contains 70% or more $Ta_2O_5$. The ability to remove most of the tantalum and/or oxides thereof from tailings originating from tantalum-containing ore avoids the inefficient removal or incomplete removal of tantalum and/or oxides thereof from mill tailings as well as other benefits, including environmental and economic benefits.

The present invention will be further clarified by the following examples which are intended to be purely exemplary of the present invention.

EXAMPLES

Sample Collection and Preparation

A sample was collected from the TANCO plant in slurry form. A dry sample can also be collected from the tailings area. If a dry sample is collected, water is added to form a slurry with a solids to water ratio of preferably greater than 40%. The slurry sample was then placed in a mixing vessel to allow for the continuous suspension of solids within the slurry. In the present experiment, a laboratory scale Denver flotation cell was utilized.

Initial Iron Removal Stage

A Sepor "Automagnet" hand magnet was utilized to recover magnetic fractions from the slurry. The hand magnet operated on the principal of a plunger manipulation to extract the magnetic material from the slurry, which is continuously being agitated by the laboratory flotation cell. The magnetic fraction was then discarded. This process simulates the use of a wet low intensity magnetic separator in full-scale plant applications.

Leaching Stage

Citric acid was added in solution (preferably 30–50wt % in strength) at a rate of approximately 0.3 kg/mt to the slurry as a chelating agent. The citric acid solution was added with a 1 ml pipette. The citric acid will sequester iron ions, which will be produced with the addition of acid during leaching. 93% sulfuric acid is then added with a syringe in order to reduce the pH of the slurry down to 2.0. The pH was maintained at 2.0 by intermittently adding acid as the pH showed signs of increasing. The increase in pH was caused by the acid consumption as the iron particles are being dissolved. This process was carried out for approximately 1.0 hr, where the pH became relatively stable indicating the absence of undissolved iron particles (i.e., indicating the complete dissolution of iron particles. All remaining iron was then in solution form. A higher pH for the leach process could be maintained however, leach time would be increased. pH monitoring was done with a Horiba D-12 pH meter. This leach process simulates the use of a Denver conditioner or equivalent in full scale plant applications.

Filtering Stage

The sample was removed from the Denver flotation cell (i.e. leach cell) and poured onto a pan filter for the removal of liquids. No water was added between the leaching stage and the end of the filtering stage. This would cause an increase in pH, which would cause iron in solution to precipitate and not be removed as a liquor from the filtering stage. The removal of iron would therefore not be complete and inferior flotation results would be obtained. Total removal of the liquor is not absolutely necessary however, the more that is removed, the more selective the flotation process will be. However, the lower the moisture in the cake after filtering, the more selective the flotation process will be. The cake moisture in the tests after filtering was between 7–10%. This filtering stage simulates a horizontal belt filter or equivalent found in full scale operations.

Re-Slurrying and Flotation Feed Preparation Stage

The filter cake was placed in the Denver laboratory flotation cell. Water was added to the cake as the impeller was activated to maintain solids suspended during the slurrying process. Flotation tests can be performed on slurry samples with solids concentrations varying from 5–60%. Water addition quantity for slurrying was determined by flotation solids concentration requirements.

Flotation Stage

Citric acid was added at a rate of 0.075 kg/mt to the flotation feed slurry to ensure sequestering of residual iron when pH was decreased for the flotation process. The surfactant or reagent sulphosuccinamate was added at a 5% dilution (diluted with water) and at a rate of approximately 0.125 kg/mt to the slurry with a syringe. Various dilutions of sulphsuccinamate can be used. Sulfuric acid was then added in order to reduce the slurry pH to approximately 2.0. Slightly lower pH values (pH 1.5–1.7) will provide a more selective flotation process with higher costs attributed. Air was introduced to the slurry at the bottom of the agitator by opening a valve located on the upper end of the impeller shaft of the flotation cell. A layer of froth was created at the top of the slurry with the introduction of air. The froth was manually skimmed over a lip on the flotation cell to a pan with a plastic paddle. This process was continued for a period of approximately 2.5 minutes. The air supply was then turned off. Again, sulphosuccinamate was added at a 5% dilution and at a rate of approximately 0.125 kg/mt to the slurry. The air was then once again turned on and the skimming process was repeated. The surfactant addition and flotation process was repeated twice more. Total sulphosuccinamate addition was therefore approximately 0.500 kg/mt. This repeating process is beneficial in the flotation industry and can be seen on full-scale operations. In a full-scale operation, a flotation process is normally multi-celled with reagent addition between cells in some cases.

The froth typically contained 2–6% of the weight and contains between 90% to nearly all of the detectable tantalum contained in the initial sample. While maintaining the recovery of tantalum above 90%, these tests show that one can concentrate tantalum well over 20 times the original value.

Tantalum Lab Flotation Testwork Examples

| Process Description | Tantalum Recovery (%) | Weight Recovery (%) | Concentrate Grade % Ta2O5 | Feed Grade % Ta2O5 | Tailings Grade % Ta2O5 | Enrichment Ratio | Surfactant Addition Kg/mt |
|---|---|---|---|---|---|---|---|
| Basic Flotation (No Iron Removal) | 53.82 | 4.46 | 0.449 | 0.037 | 0.018 | 12.06 | 0.745 |
| Remove Iron Manually + 2 hr Leach with Citric Acid + Filtering | 95.67 | 4.04 | 1.048 | 0.044 | 0.002 | 23.65 | 0.513 |
| | 100.00 | 6.05 | 0.666 | 0.040 | 0.000 | 16.53 | 0.870 |
| Remove Iron Manually-No Leach-No Filtering | 7.16 | 2.35 | 2.590 | 0.085 | 0.081 | 3.04 | 0.539 |
| Remove Iron Manually + 2 hr Leach With Citric Acid + Filtering | 84.38 | 7.01 | 1.003 | 0.083 | 0.014 | 12.04 | 1.017 |

In the above Table, the last test entry involved reclaimed material from an old mill concentrator tailings, which contained highly oxidized particles.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of recovering metal and/or oxide thereof present in a slurry comprising steps (a)–(d):
   (a) magnetically separating at least a portion of magnetic impurities present in said slurry from said slurry wherein said magnetically separating comprises applying a magnetic force of 2000 gauss or lower to said slurry in order to attract at least a portion of said magnetic impurities;
   (b) leaching or dissolving at least a portion of the remaining magnetic impurities in said slurry after step (a);

(c) adding at least one chelating agent to said slurry at about the same time as step (b) or after step (b); and (d) recovering solids comprising said metal and/or oxide thereof present in said slurry after step (c).

2. The method of claim 1, further comprising forming a new slurry with the solids obtained from step (d).

3. The method of claim 2, further comprising adding at least one surfactant to said new slurry.

4. The method of claim 3, wherein said surfactant comprises sulphosuccinamate.

5. The method of claim 1, wherein said magnetic impurities comprise iron.

6. The method of claim 1, wherein said metal and/or oxide thereof comprises at least one valve metal and/or oxide thereof.

7. The method of claim 1, wherein said metal and/or oxide thereof comprises tantalum and/or oxide thereof.

8. The method of claim 1, wherein said metal comprises tantalum and/or oxide thereof and said magnetic impurities comprise iron.

9. The method of claim 1, wherein said chelating agent comprises citric acid.

10. The method of claim 1, wherein said recovering solids is accomplished by the filtration of the slurry to recover said solids.

11. The method of claim 1, wherein prior to magnetically separating, said slurry is subjected to a gravity separation.

12. The method of claim 2, wherein said new slurry is subjected to a flotation process to recover said metal from said new slurry.

13. The method of claim 1, wherein said metal and/or oxide thereof is tin, copper, nickel, lead, cobalt, or oxides thereof.

14. The method of claim 1, wherein said leaching or dissolving is achieved by the addition of one or more acids.

15. The method of claim 1, wherein said step (b) and step (c) occur at about the same time.

16. The method of claim 14, wherein said chelating agent and said acid are added at about the same time.

17. The method of claim 1, wherein said slurry has a pH of about 4 or lower throughout said method.

18. The method of claim 1, wherein said metal and/or oxide thereof has a particle size of from about 1 micron to about 100 microns.

19. Tailings obtained from ore comprising 250 ppm or less $Ta_2O_5$ in said tailings, wherein the ore is pegmatite, and wherein said tailings have a particle size of from about 1 micron to about 100 microns.

20. The tailings of claim 19, wherein said tailings comprise 200 ppm or less $Ta_2O_5$.

21. The tailings of claim 19, wherein said tailings comprise from about 10 ppm to about 200 ppm $Ta_2O_5$.

22. Tailings obtained from ore comprising 250 ppm or less tantalum and/or oxide thereof in said tailings, wherein the ore is a tantalum bearing ore, and wherein said tailings have a particle size of from about 1 micron to about 100 microns.

23. The railings of claim 22, wherein said tantalum bearing ore contains at least about 0.025 wt % $Ta_2O_5$, based on the weight of the ore.

24. The tailings of claim 22, wherein said tantalum bearing ore comprises one or more tantalum minerals.

25. The tailings of claim 24, wherein said tantalum minerals comprise wodginite, pyrochlore-microlite group, microlite, Simpsonsite, colombo-tantalite group, tantalite, ixiolite, bismutio-tantalite, tapiolite, titano-wodginite, rankamaite, or combinations thereof.

26. The tailings of claim 22, wherein said tantalum bearing ore is carbonitite, apogranite, alkaline complex, pegmatitic granite, scarn, or combinations thereof.

27. The tailings of claim 22, wherein said tailings comprise from about 10 ppm to about 100 ppm $Ta_2O_5$.

28. The tailings of claim 22, wherein said tailings comprise from about 10 ppm to about 70 ppm $Ta_2O_5$.

29. The tailings of claim 19, wherein said particle size is from about 1 microns to about 7 microns.

30. The tailings of claim 19, wherein said particle size is from about 5 microns to about 35 microns.

31. The tailings of claim 22, wherein said particle size is from about 1 micron to about 75 microns.

32. The tailings of claim 22, wherein said particle size is from about 5 microns to about 35 microns.

33. A method of recovering metal and/or oxide thereof present in a slurry comprising:

(a) magnetically separating at least a portion of magnetic impurities present in said slurry from said slurry;

(b) leaching or dissolving at least a portion of die remaining magnetic impurities in said slurry;

(c) adding at least one chelating agent to said slurry; and (d) recovering solids comprising said metal and/or oxide thereof present in said slurry, wherein said metal end/or oxide thereof comprises tantalum and/or oxide thereof.

34. A method of recovering metal and/or oxide thereof present in a slurry comprising:

(a) magnetically separating at least a portion of magnetic impurities present in said slurry from said slurry;

(b) leaching or dissolving at least a portion of the remaining magnetic impurities in said slurry;

(c) adding at least one chelating agent to said slurry and (d) recovering solids comprising said metal and/or oxide thereof present in said slurry, wherein prior to magnetically separating, said slurry is subjected to a gravity separation.

35. The method of claim 34, wherein said metal and/or oxide thereof is a valve metal and/or oxide thereof.

* * * * *